Nov. 11, 1930.　　　M. G. KURTH　　　1,781,332
HAY LOADER
Filed Dec. 1, 1927　　2 Sheets-Sheet 1

INVENTOR
Matthew G. Kurth
BY
Erwin Wheeler & Woolard
ATTORNEYS

Patented Nov. 11, 1930

1,781,332

UNITED STATES PATENT OFFICE

MATTHEW G. KURTH, OF MADISON, WISCONSIN, ASSIGNOR, BY DIRECT AND MESNE ASSIGNMENTS, TO MASTER MACHINERY AND IMPLEMENT COMPANY, OF MADISON, WISCONSIN, A CORPORATION OF WISCONSIN

HAY LOADER

Application filed December 1, 1927. Serial No. 236,934.

This invention relates to improvements in hay loaders and is also particularly adapted for picking up field refuse of all sorts, including corn stalks and the like.

It is the primary object of the invention to provide a simplified hay loader which will reach a maximum effectiveness in picking up hay and other like products from the ground and deliver it to a vehicle with a minimum number of moving parts.

In referring to the effectiveness which is one of the desired features of a machine embodying my invention, I mean to include the thoroughness with which material is picked up from the ground, freedom from stoppage and from mechanical troubles, ability to handle a variety of kinds of material, and rapidity of operation. It is my purpose to provide for all of these desirable results by the present invention.

The increasing prevalence of the corn-borer and other insect pests has made it necessary to pick up and destroy all corn stalks and other field refuse. As above indicated, the present machine is calculated to accomplish this result but, for lack of any better generic term, the word "hay" will be used hereinafter without specific reference to corn stalks or other plants and it will be understood to be used generically.

In the drawings:

Figure 3 is an enlarged detail view in side elevation of the upper end of the loader.

Figure 4 is a view taken on line 4—4 of Figure 3.

Figure 5 is a detail view showing the means of securing a loop in one of the teeth.

Figure 6 is a detail view showing the means for securing the end of one of the teeth.

Figure 7 is a detail of the conveyor assembly.

Figure 8 is a detail of the rake tooth assembly mounting.

Figure 9 is a detail of a particular form of tooth which may be used to advantage.

Figure 10 is a detail showing in fragmentary cross section the tooth illustrated in Figure 9.

Like parts are identified by the same reference characters throughout the several views.

Figure 1:
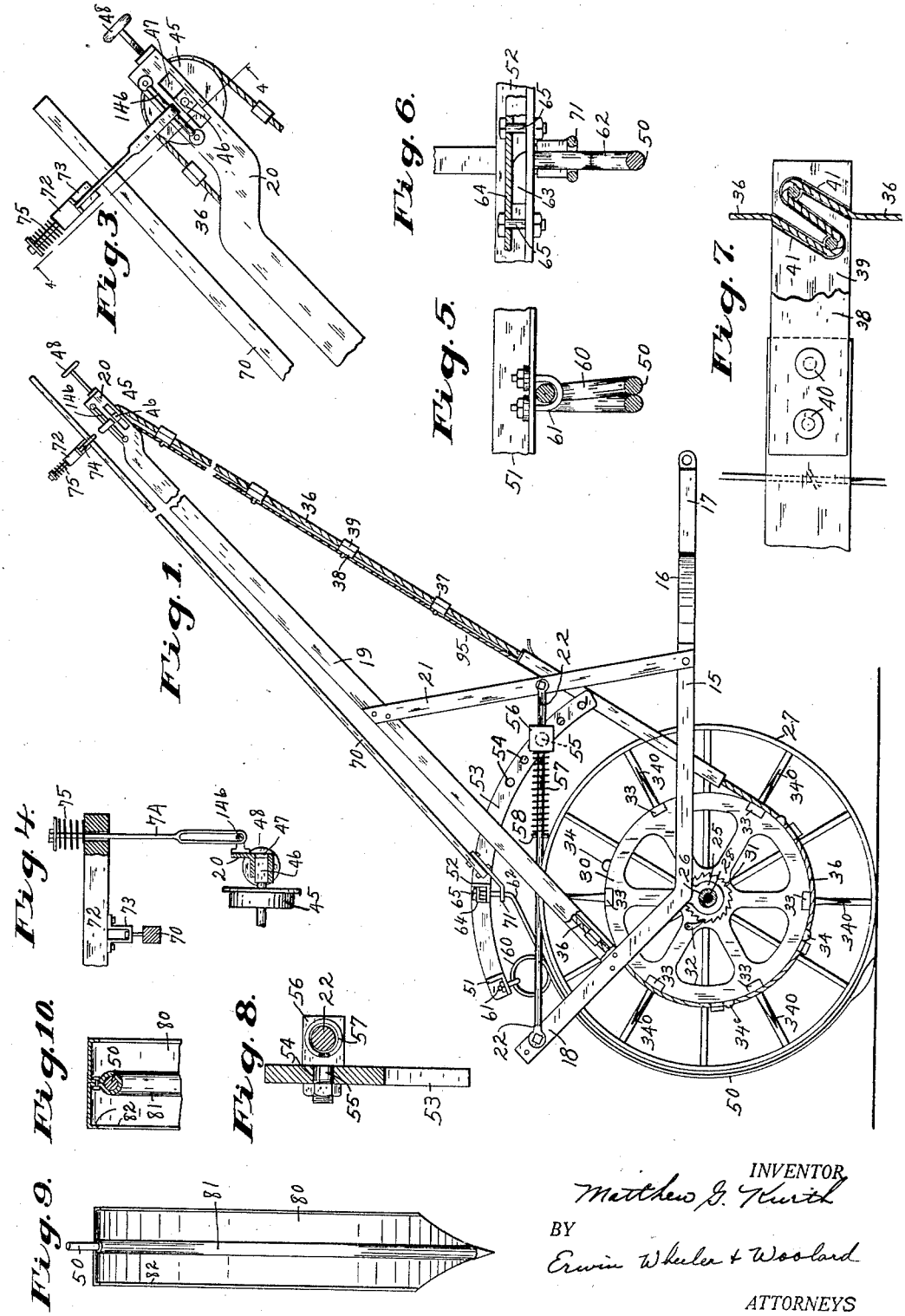
Figure 1 is a side view of an improved hay loader embodying this invention with the wheel nearest the observer removed.

The main frame of the machine comprises a symmetrical arrangement of side frame members, one of which is shown at 15. These members converge at 16 to a tongue 17 adapted to be secured in the usual way to the hay rack or other vehicle to be loaded.

Upwardly inclined bars 18 at the rear of the main frame contribute to the support of the conveyor frame and the rake assembly hereinafter to be described. The conveyor frame may conveniently be made of angle irons which serve as a guide for the conveyor and are offset at 20 to support the upper conveyor pulley guide. The angle irons 19 are connected substantially at right angles to the rearwardly inclined bars 18 of the main frame and are also braced directly from the main frame at 21. Tie rods 22 connect the braces 21 with bars 18 and also perform the function of supporting and adjustably guiding the rake tooth assembly as will hereinafter be more fully brought out.

The frame structure thus far described is provided at 25 with bearings for the sleeves 26 connected with wheels 27. The axle shaft 28 which extends through such sleeves serves as a guide for the wheels, but derives no motion therefrom, the wheels being free thereon. Carried by this shaft immediately inside of the side frame members 15 and bearings 25, are disks 30 which may be considered as comprising the heads of a reel or skeleton drum. These disks, however, require no connection with each other and each serves as a driving pulley for one end of the conveyor belt.

Figure 2:
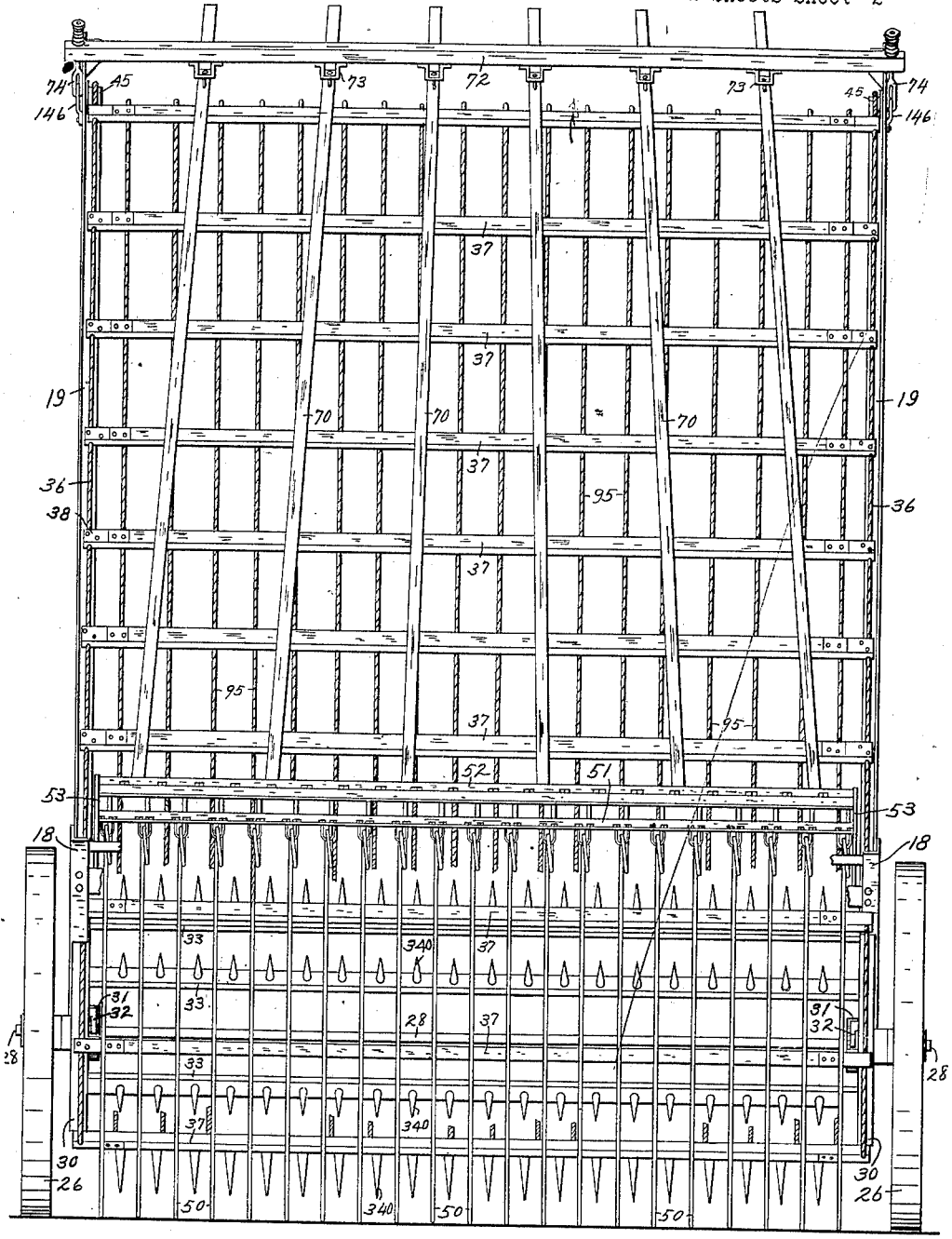
Figure 2 is a rear elevation of the hay loader shown in Figure 1.

Each of the sleeves 26 is connected respectively to its adjacent wheel 27 and each is provided at the inside of the bearing 25 with a ratchet wheel 31. The complementary face of each of the pulley disks 30 is provided with one or more pawls 32 adapted to interact with the adjacent ratchet 31 to transmit motion from the wheel 27 through sleeve 26, ratchet wheel 31 and pawl 32 to the conveyor pulley head 30. This arrangement merely comprises a well known form of equalizer which permits one wheel of the device to rotate faster than the other in turning corners. Where no equalizer is desired, it is obviously possible to connect the wheels and the reel or drum directly to the axle. It is also possible, if desired, to connect the pulley heads 30 together to provide a reel of any required degree of substantiality. By way of suggestion in this regard, I have shown a series of connecting bars 33 which may be mortised into the peripheries of the respective heads 30 as indicated in Figure 1 and which may be provided at intervals with radially projecting teeth 34 as shown in Figure 2.

The peripheries of the reel heads 30 are provided with lugs at 340 which are adapted to engage the various slats of the conveyor belt for the propulsion thereof.

The conveyor 35 consists of two strands of endless rope or the like as shown at 36. These strands are connected at intervals by wooden slats 37 extending transversely of the machine and provided at their ends with metal fittings each of which includes two parts 38 and 39 bolted together at 40 upon the slats as shown in Figure 7. The fittings are channeled as indicated at 41 in Figure 7 to engage clampingly the wire rope or flexible side link 36 of the conveyor. The S-shape of the channel 41 is such that it will be virtually impossible for the fittings to slip upon the wire rope 36, thus ensuring that the parts will remain permanently assembled in their proper relative positions.

The upper pulley 45 for the conveyor 35 is provided with slidably mounted journals 46 guided in a slot 47 in the offset portion 20 of the side angles 19 of the conveyor frame. The position of each journal in its respective slot is controlled by a hand screw 48 which provides the convenient means for tightening the conveyor belt as desired.

The hay is picked up from the ground and delivered upon the conveyor by a rake tooth assembly, the arrangement and mounting of which comprises one of the most important features of the present invention. This assembly consists of a large number of rake teeth 50 carried by a special rake tooth frame consisting of the transverse angle members 51 and 52 and a set of forwardly extending arms 53. The assembly is supported in part from contact of the rake teeth with the ground and in part by its pivotal connection with the remainder of the machine.

It will be noted that the arms 53 are arcuately curved in approximate concentricity with wheels 27. Each arm is provided with a plurality of apertures 54 whereby it may be adjustably pivoted by a stud 55 to a guide block 56 adjustable upon the rod 22 heretofore described. A compression spring 57 provided with a fixed seat at 58 upon such rod acts upon the block 56 to urge it forwardly upon the rod which is preferably approximately horizontal.

This arrangement provides for the bodily movement of the entire rake assembly in a longitudinal direction, while at the same time permitting the pivotal movement of the rake assembly upon stud 55 in any position of the guide block 56. The apertures 54 also provide for the initial setting of the rake assembly in any desired angular position.

Numerous experiments have indicated that a mounting of this kind for the rake assembly of a hay loader is extremely important not only as to the horizontal yielding movement provided in addition to the pivotal movement, but further in connection with the general location of the pivot point or fulcrum about which the rake assembly oscillates. It is desirable that this fulcrum point (the axis of stud 55) should be located well forward of a vertical plane including the axles upon which wheels 27 revolve. It will be noted from an inspection of Figure 1 that the normal position of the parts contemplated by the present invention involves a normal location for the pivotal fulcrum of the rake assembly at an angle of approximately 45° above the main frame from the axle and at a radius which exceeds somewhat the radius of the wheels. This general location of the fulcrum for the rake teeth is preferred and has been found to permit an ideal yielding movement of the rake teeth in passing over rough ground and accommodating excessive quantities of hay during the operation of the machine. Where the fulcrum is located directly above the axle or even at the rear thereof, the lift of the rake teeth in passing over obstructions is inadequate and the teeth are caused to move rearwardly an excessive distance before the required lift is had.

In the present construction, any obstruction either on the surface of the ground or in the amount of hay being handled will immediately introduce a movement of the rake teeth in which the rate of lift or elevation of the assembly in proportion to the total distance which it moves will be relatively high. At the same time, a greater percentage of the weight of the rake assembly is imposed upon the hay than would be the case if the fulcrum point were located more nearly above the axle. If, on the other hand, the fulcrum point were located too low in front of the wheels, an excessive proportion of the weight of the rake assembly would be carried directly upon the rake teeth from the ground.

It is desired to form the teeth in such a manner that each tooth may have a comparatively high degree of resilience independently of the yielding movement of the rake assembly as a whole. It is also very desirable that the rake teeth should be so supported from the carrying frame that the transverse frame bearings will not contact with and thereby obstruct the hay which, in passing along the teeth, tends to press between the teeth somewhat and would lodge upon a frame member too close to the path of travel of the hay. To accomplish these two desirable characteristics of the teeth and their relation to the supporting frame, I prefer to construct the teeth as follows:

Each tooth is preferably made up of a resiliently flexible bar formed to provide a loop at 60 which is secured by a U-bolt 61 to the transverse frame member 51. The loop 60 not only increases the resilience of the tooth, but also spaces from the mounting angle iron 51 that portion of the tooth upon which the hay passes. It is found, furthermore, that the loop has no tendency in itself to obstruct the free flow of hay along the under surface of the tooth.

Adjacent its end, each tooth 50 is bent upwardly as shown at 62 and passes through an aperture in the angle bar 52 whereupon the tooth is bent over at right angles as indicated at 63 in Figure 6. A channel member 64 is now clamped by means of bolt 65 to the upper face of angle iron 52, thereby anchoring the laterally bent end 63 of the tooth and fixing the angular position thereof. The offset provided at 62 has the effect of spacing the path of the hay materially away from the transverse frame member 52 so that no lodging of hay thereon is possible. It also has the effect in the particular arrangement shown in Figure 1 of holding the rake tooth in concentricity with the reel to such an extent as to tend to compact the hay upon the conveyor 35.

In order to keep the hay under a certain degree of confining pressure during its upward movement upon conveyor 35, I provide a set of floating packer bars 70 which are connected at their lower ends to the vertical portions 62 of rake teeth 50 by means of apertured fittings 71, such fittings being freely movable vertically upon the portions of the rake teeth engaged thereby. At their upper ends, bars 70 are connected with a transverse member 72 from which they are spaced by the fittings 73. The transverse member 72 is resiliently supported from slides 46 by means of the tie bolts 74 and compression springs 75. The tie bolts are looped at 76 and engage the longitudinally extending guides 77, permitting both downward and longitudinal movement to the transverse member 73. It is only after such member has moved upwardly to the full extent of loops 76 that the springs become effected. Thus, during the passage of a normal amount of hay, only the weight of the packer bar assembly is imposed thereon, but when the quantity of hay becomes excessive, it is packed under spring pressure. It will be noted that this is an extremely flexible mounting designed to yield not only upwardly, but also in a direction to accommodate movement of the pressure bars occasioned by the bodily oscillation of the rake assembly.

While the ordinary spring rake tooth heretofore described is entirely adequate for many purposes, I prefer to use a special form of tooth in picking up litter. This tooth is made by adding to the spring rake tooth 50, a light sheet metal pan shown at 80 in Figures 9 and 10. This pan is provided with a central rib at 81 so formed as to receive the rod or standard tooth 50. The width of the pan is such that it greatly reduces the space between consecutive spring teeth. In order to prevent the hay from working between consecutive pans 80, it is preferred to bend the margins of the pans forwardly at 82 to provide narrow flanges upon which the hay will tend to ride. The arrangement is such that it produces the effect of a greatly increased number of spring teeth and enables the machine to pick up very small litter with very little loss and without the expense incident to the mounting of an equivalent number of individual spring teeth.

The operation of the machine will be apparent from the foregoing description, but it may be said briefly that when the device is attached to a vehicle, the discharge or upper end of the conveyor system will overhang the rear of the vehicle in a way to be adapted to deliver hay thereupon. The rake teeth will closely follow the ground due not only to their own resilience, but to the fact that a part of the weight of the rake assembly is imposed upon them because of the location of the fulcrum stud 55. Hay picked up by the teeth will be elevated therein both by the pressure of succeeding hay and by the action of the radial teeth 45 carried by the cross members of the reel or drum and projecting between the slots of the conveyor.

The curvature of the teeth will hold the hay closely to the conveyor and will ultimately compact the hay thereon. The fact that the anchorage members for the teeth are spaced a material distance away from the path of travel of the hay prevents any lodging of hay against such members at the time it is being compacted on the conveyor. Obviously at this time the extent to which the hay tends to penetrate between the teeth reaches a maximum.

As the hay passes from the teeth in its upward travel and upon the conveyor, it is held compacted by the pressure bars 70 which confine it within a gradually narrowing space, but are resiliently yieldable to accommodate excess quantities of hay. The result of this arrangement is to deliver fully compacted hay from the discharge portion of the conveyor.

It will be noted that there are very few moving parts in the hay loader described above as an embodiment of this invention. It will also be obvious to those skilled in the art that numerous departures may be made from the specific disclosure in this application without deviating from the spirit of the invention as set forth in the appended claims and described herein.

I claim:

1. In a device of the character described, the combination with a set of wheels, of a reel mounted therebetween and operatively connected to be driven therefrom, a belt conveyor having an end encircling said reel, and a rake complementary to said reel and conveyor and provided with a mounting to which said rake is fulcrumed ahead of a vertical plane through the axis of said wheel and above a horizontal plane therethrough.

2. In a device of the character described, the combination with a wheeled frame, of a rake device fulcrumed to said frame substantially forwardly of its line of contact with the ground, and means co-operating with said rake device to provide a restricted space for the elevation of material along said rake.

3. The combination with a wheeled frame, of a rake device including rake teeth curvilinear about the axis of the wheels of said frame, and a rake tooth carrier fulcrumed to said frame ahead of and above said axis, together with means co-operating with said teeth to provide a restricted space for the elevation of material thereon.

4. The combination with a wheeled frame, of a rake device including rake teeth curvilinear about the axis of the wheels of said frame, and a rake tooth carrier fulcrumed to said frame ahead of and above said axis, together with means co-operating with said teeth to provide a restricted space for the elevation of material thereon, said means comprising a reel rotatably mounted co-axially with and between the wheels of said frame.

5. The combination with a wheeled frame, of a rake device including rake teeth curvilinear about the axis of the wheels of said frame, and a rake tooth carrier fulcrumed to said frame ahead of and above said axis, together with means co-operating with said teeth to provide a restricted space for the elevation of material thereon, said means comprising a reel rotatably mounted co-axially with and between the wheels of said frame connected with said wheels to receive motion therefrom and provided with means for engaging the material to be elevated.

6. The combination with a frame provided with wheels and a reel mounted between said reels and operatively arranged to receive motion from a wheel, of an endless conveyor belt mounted upon said reel, a set of rake teeth curvilinear to said reel in substantial concentricity therewith, and a carrying frame to which said teeth are connected provided with a pivotal connection to said first mentioned frame in advance of and above the axis of said wheels, said pivotal connection being yieldable in a direction to relieve strain upon said teeth.

7. In a device of the character described, the combination with a wheeled frame and a reel connected to receive motion from the wheels thereof, of a frame member providing a guide extending in a forward and rearward direction, a fulcrum member slidable upon said guide, yieldable means for positioning said fulcrum member, and a rake assembly pivoted to said fulcrum member for bodily oscillation upwardly and rearwardly and bodily movement forwardly and rearwardly.

8. In a device of the character described, the combination with a conveyor system, of a rake arranged to deliver material thereto and comprising transverse frame members and rake teeth spaced from said frame members and connected therewith substantially in the plane of said teeth, whereby said connections offer no obstruction to hay traversing said teeth for delivery upon said conveyor system.

9. The combination with a conveyor system including a reel and an endless conveyor belt mounted thereupon, of a set of rake teeth arcuately curved about said reel, a frame pivotally supported in advance and above the axis of said reel and provided with transverse members for connection with said teeth, said teeth being provided with portions offset in their respective vertical planes for engagement with said frame at points remote from the path of hay about said reel.

10. In a device of the character described, a rake assembly comprising a pair of transverse frame elements and rake teeth comprising yieldable rods, each provided with a loop connected at its top to one of said frame elements and an offset portion connected with another of said frame elements adjacent the delivery end of the tooth, each such tooth providing a substantially smooth and unimpeded path for material picked up thereby.

11. In a device of the character described, the combination with a main frame provided with supporting wheels and a reel mounted between said wheels and provided with an operative connection to be driven from one thereof, of a conveyor frame including upwardly inclined guide members substantially tangential to said reel, a guide pulley supported adjacent the top of said members, a conveyor belt mounted upon said pulley and said reel, a rake assembly pivoted to said frame in advance of and above the axis of said wheels and provided with rake teeth and a support for said teeth spaced therefrom at their delivery ends, and pressure slats associated with said conveyor from a point near the delivery ends of said teeth to a point adjacent said pulley, said slats being floated for movement in accordance with the movement of said rake assembly about its fulcrum.

12. In a device of the character described, the combination with a conveyor system, including a conveyor belt and upper and lower guide pulleys therefor, of a rake assembly associated with said conveyor system and arranged to pick up material and deliver it to said belt, a main frame provided with wheels for the support of said conveyor system, a pivotal connection between said rake assembly and said frame in advance of the axis of said wheels, and a set of pressure slats connected with said rake assembly and extending therefrom along said belt, said slats being floatingly mounted for freedom of movement in accordance with movement of said rake assembly.

13. In a device of the character described, the combination with a conveyor system including upper and lower pulleys, an inclined guide, and an endless belt traversing said guide and said pulleys, of a frame for the support of said system provided with wheels concentric with said lower pulley and operatively connected for the transmission of motion thereto, a rake assembly including a sub-frame pivoted to said first mentioned frame above and ahead of the wheels thereof, flexible teeth provided with substantially continuous curvilinear delivery surfaces spaced from said sub-frame and arranged to discharge material upon said belt above said lower pulley, and floating pressure slats connected with said teeth to comprise extensions thereof above said belt.

14. A rake assembly comprising a sub-frame having transverse members and a rake tooth formed to provide a loop connected with one of said members and an end projecting through an aperture in another of said members, said end being turned over at right angles upon said last mentioned member, together with a channel bolted to said last mention lever in clamping engagement over said end, whereby said rake tooth provides a substantially continuous hay delivering surface in spaced relation to the transverse members of said frame.

15. In a device of the character described, the combination with a wheeled frame, of a longitudinally extending guide above the axis of the wheels of said frame, a slide reciprocable on said guide, resilient means for positioning said slide in advance of said axis, and a rake assembly fulcrumed to said slide.

16. In a device of the character described, the combination with a frame provided with supporting wheels and an elevating reel, of a rake assembly floatingly connected with said frame for yielding movement upwardly and from said reel, the assembly including rake teeth extending about said reel, a conveyor arranged to receive material from said reel and teeth, and pressure slats co-acting with said conveyor and connected to said assembly to partake of the yielding movement of said rake assembly while constituting extensions of said teeth.

MATTHEW G. KURTH.